Patented Jan. 15, 1946

2,392,974

UNITED STATES PATENT OFFICE 2,392,974

DERIVATIVES OF PROPIONIC ACID

Albert M. Clifford and Joy G. Lichty, Stow, Ohio, assignors to Wingfoot Corporation, Wilmington, Del., a corporation of Delaware No Drawing. Application February 10, 1943, Serial No. 475,428

1 Claim. (Cl. 260—473)

This invention relates to esters which have been found satisfactory as plasticizers for polyvinyl alcohol, polyvinyl butyraldehyde, copolymers of vinyl chloride and vinylidene chloride, copolymers of butadiene and acrylonitrile, etc. The compounds are esters of aralkoxypropionic acid and have the formula:

$$R.O.CH_2.CH(R'').COOR'$$

where R is aralkyl, R' is alkyl, aralkyl or alicyclic, and R'' is hydrogen, methyl or ethyl.

The invention will be illustrated by the following examples:

EXAMPLE 1

*Amyl-beta-benzyloxypropionate*

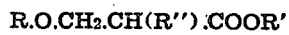
$$C_6H_5CH_2O.C_2H_4.COOC_5H_{11}$$

Beta-benzyloxypropionitrile was prepared by the addition of benzyl alcohol to acrylonitrile with sodium methylate as a catalyst. A mixture of 483 grams of the benzyloxypropionitrile, 600 cc. of mixed amyl alcohols, and 54 grams of water was heated to 90° C. on a steam bath. Dry HCl gas was bubbled into the solution until little additional ammonium chloride separated. The liquid portion of the reaction on distillation gave a good yield of an ester boiling at 190–220° C./35 mm.

EXAMPLE 2

*Ethoxyethyl-beta-benzyloxypropionate*

$$C_6H_5CH_2.O.C_2H_4.COO.C_2H_4.OC_2H_5$$

This compound was prepared by adding gaseous HCl to a mixture of 161 grams benzyloxypropionitrile, 180 grams Cellosolve (hydroxyethyl ether), and 18 grams water at a temperature of about 90° C. until no more ammonium chloride separated. Distillation of the filtrate gave a good yield of the ester boiling as 190–200° C./35 mm.

The amount of water used may be reduced or the conversion of the nitrile to the ester may be carried out with alcohol in the absence of water. Other mineral acids, such as sulfuric acid, may replace the HCl.

Other compounds having the above general formula which may be prepared in a similar manner are:

Cyclohexyl-β-benzyloxypropionate
Octyl-β-benzyloxypropionate
Dodecyl-β-benzyloxypropionate
Butyl-β-benxyloxy-α-methyl-propionate
Cyclohexyl-β-benzyloxy-α-ethylpropionate
Ethyl-β-phenylethoxy propionate
Methyl-β-(p-methoxybenzyloxy) propionate

What we claim is:

Amyl-beta-benzyloxypropionate, the p h e n y l group of which is linked to the oxy group through the methylene group of the benzyl radical.

ALBERT M. CLIFFORD.
JOY G. LICHTY.